(12) United States Patent 
Sheikholeslami

(10) Patent No.: US 12,681,977 B2 
(45) Date of Patent: Jul. 14, 2026

---

(54) ENHANCING GENERATIVE AI RELIABILITY THROUGH SIMILARITY ANALYSIS

(71) Applicant: SAP SE, Walldorf (DE)

(72) Inventor: Arman Sheikholeslami, San Jose, CA (US)

(73) Assignee: SAP SE, Walldorf (DE)

( * ) Notice: Subject to any disclaimer, the term of this patent is extended or adjusted under 35 U.S.C. 154(b) by 10 days.

(21) Appl. No.: 18/815,710

(22) Filed: Aug. 26, 2024

(65) Prior Publication Data

US 2026/0057004 A1     Feb. 26, 2026

(51) Int. Cl. 
*G06F 16/383*        (2019.01) 
*G06F 40/30*        (2020.01)

(52) U.S. Cl. 
CPC ............ *G06F 16/383* (2019.01); *G06F 40/30* (2020.01)

(58) Field of Classification Search 
None 
See application file for complete search history.

(56) References Cited

U.S. PATENT DOCUMENTS

| | | | | | |
|---|---|---|---|---|---|
| 11,842,738 | B1 * | 12/2023 | Yan | ......................... | G06N 3/084 |
| 12,314,304 | B1 * | 5/2025 | Bachman | ............ | G06F 16/9024 |
| 2005/0114160 | A1 * | 5/2005 | Boehme | ................. | G06Q 10/10 |
| | | | | | 705/2 |

| | | | | | |
|---|---|---|---|---|---|
| 2024/0296279 | A1 * | 9/2024 | Gardner | ................ | G06F 40/169 |
| 2024/0362286 | A1 * | 10/2024 | He | ........................... | G06F 16/93 |
| 2025/0190449 | A1 * | 6/2025 | Zhang | ................... | G06F 16/288 |
| 2025/0200475 | A1 * | 6/2025 | Zhang | ........................ | G06F 8/30 |
| 2025/0218057 | A1 * | 7/2025 | Myron | ................ | G06N 3/0455 |
| 2025/0252122 | A1 * | 8/2025 | Bhura | ................ | G06F 16/3347 |
| 2025/0258774 | A1 * | 8/2025 | Sun | ..................... | G06F 12/0862 |
| 2025/0259036 | A1 * | 8/2025 | Pillai | ................... | G06N 3/0455 |

OTHER PUBLICATIONS

Javed, "Most Popular Text Embedding Models: A Comparison," https://medium.com/@sj112233/most-popular-text-embedding-models-a-comparison-a89ab2d3b8fe, 9 pages, Nov. 26, 2023. 
Merritt, "What Is Retrieval-Augmented Generation, aka RAG?," https://blogs.nvidia.com/blog/what-is-retrieval-augmented-generationon/ 15 pages, Nov. 15, 2023.

* cited by examiner

*Primary Examiner* — Thu N Nguyen 
(74) *Attorney, Agent, or Firm* — Klarquist Sparkman, LLP

(57)        ABSTRACT

A computer-implemented method for improved schema matching of two databases is disclosed. The method can transform one or more text benchmarks into one or more first vector embeddings, retrieve a text output from the generative AI model in response to a user prompt, transform the text output into one or more second vector embeddings, measure one or more matching scores based on comparison of the one or more first vector embeddings with the one or more second vector embeddings, and determine reliability of the text output based on evaluation of the one or more matching scores. Related systems and software for implementing the method are also disclosed.

20 Claims, 6 Drawing Sheets

Transform text benchmarks into first vector embedding . 210

Retrieve a text output from a generative AI model. 220

Transform the text output into second vector embedding. 230

Measure matching scores based on comparison of the first vector embeddings and second vector embeddings. 240

Determine reliability of the text output based on evaluation of the matching scores. 250

200

ENHANCING GENERATIVE AI RELIABILITY THROUGH SIMILARITY ANALYSIS

BACKGROUND

Enterprise Resource Planning (ERP) systems are comprehensive software solutions that manage and integrate a company's financials, supply chain, operations, reporting, manufacturing, and human resource activities. Recently, the integration of generative artificial intelligence (AI) with ERP systems has become increasingly common, aiming to automate and enhance various services. However, this integration presents significant challenges, particularly in ensuring the reliability and relevance of the AI-generated responses. In many ERP applications, such as automated questionnaire generation and customer-facing services, the AI operates autonomously, without human supervision. This lack of oversight can lead to the dissemination of unreliable or unverified responses, posing a risk of misinformation, compromised service quality, and potential erosion of customer trust. Ensuring the accuracy and contextual appropriateness of these automated responses is crucial to maintaining high service standards and customer satisfaction. Thus, room for improvements exists for enhancing the reliability and relevance of AI-generated responses in ERP systems.

DETAILED DESCRIPTION

Figure 1:
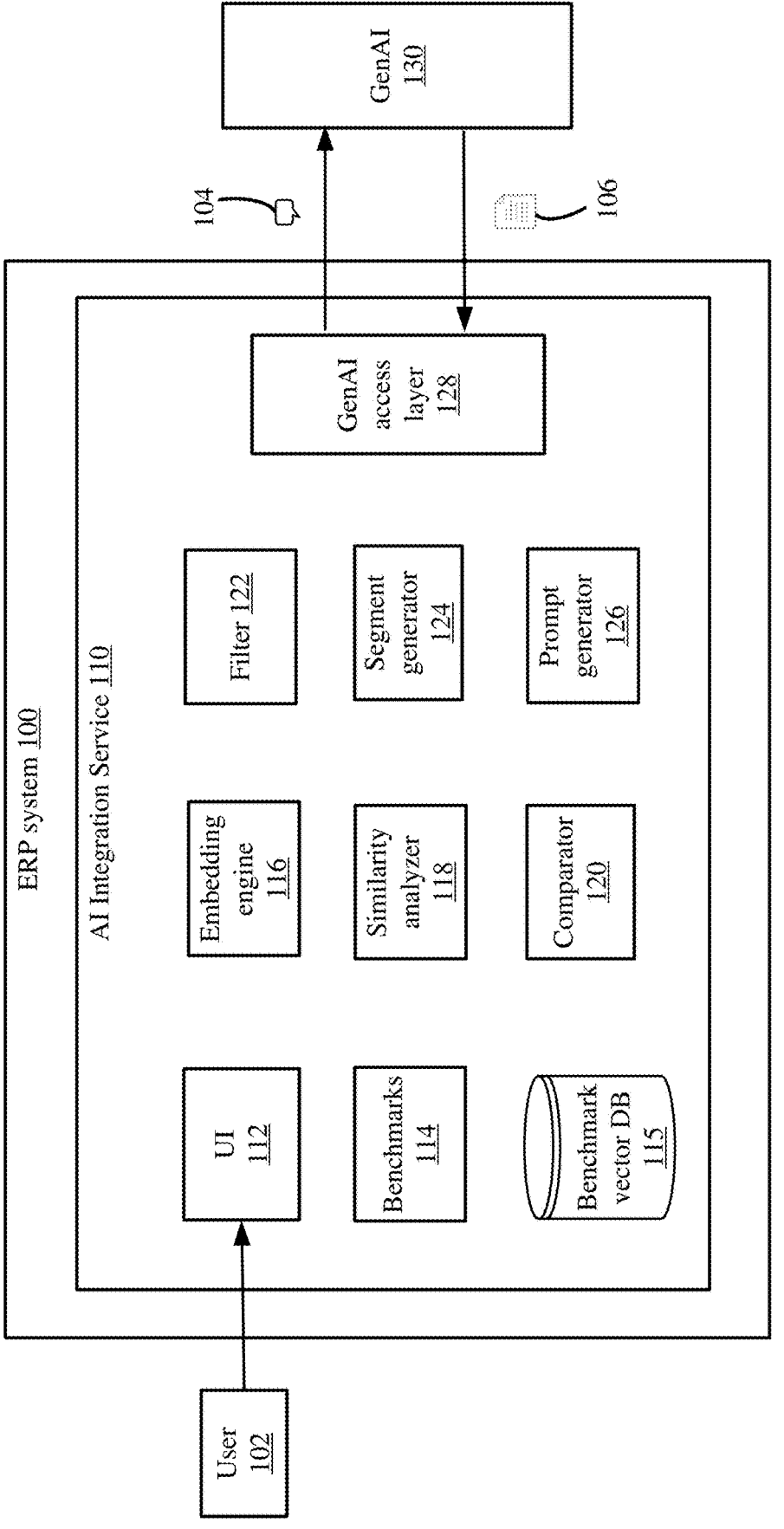
FIG. 1 is an overall block diagram of an example ERP system including an AI integration service that enhances reliability of AI-generated responses.

Overview of Generative AI in ERP Systems

ERP is software that allows an organization to use a system of integrated applications to manage their business and automate many back-office functions related to technology, services and human resources. Some ERP systems, such as S/4HANA provided by SAP SE, of Walldorf, Germany, offer AI solutions to add value to customers. Integration of AI in ERP systems can potentially enhance automation, data analysis, and decision-making.

Recent advancements in generative AI, such as large language models (LLMs), offer exciting new possibilities for ERP systems. By harnessing the power of advanced generative AI models, businesses can streamline their processes, enhance decision-making, and automate repetitive tasks, driving growth and innovation. For example, generative AI enables users to interact with the system using natural language, making it easier to navigate and access required functionalities. Non-technical users can leverage these capabilities simply by describing their business tasks in natural language, eliminating the need for extensive technical expertise. This can lead to efficient retrieval of information and a more enjoyable user experience. Automation in customer support can expedite issue resolution and enhance satisfaction levels. Generative AI can also assist in content creation and knowledge management, generating or improving various types of content, such as marketing and sales copies. This makes it easier for businesses to communicate their value proposition to their customers. Additionally, generative AI can summarize complex ERP documents and data, enabling users to quickly understand key points and make informed decisions. For developers working with ERP systems, features such as code generation from natural language and code auto-completion can increase efficiency and reduce time-to-market for new features or improvements. Automated generation of documentation ensures access to accurate and up-to-date information, further streamlining the development process.

Despite the immense potentials of generative AI, its integration into ERP systems faces some challenges. One primary concern revolves around reliability issues such as hallucination, misinformation, and misunderstanding. Hallucination refers to the AI generating information that is not grounded in the input data, leading to potentially misleading or false outputs. Misinformation can occur when the AI generates responses based on outdated or incorrect data, while misunderstanding arises when the AI misinterprets the user's input or the context of the conversation. These issues can compromise the quality of the AI-generated responses, leading to potential misinformation, decreased service quality, and erosion of customer trust.

The technologies described herein address the above challenges of integrating generative AI into ERP systems. By leveraging semantic analysis through predefined benchmarks and iterative refinement based on similarity assessment, the disclosed solution can enhance the integrity and dependability of autonomously generate AI responses in the ERP systems.

Example ERP System Integrated with Generative AI

FIG. 1 shows an overall block diagram of an example ERP system 100 integrated with generative AI.

The ERP system 100 includes an AI integration service 110 configured to support generative AI capabilities and enhance reliability of AI generated responses. The AI integration service 110 includes a generative AI access layer 128, which can be configured to interface with a generative AI model 130 (or "GenAI") such as a LLM described more fully below. In some examples, the generative AI model 130 can be hosted externally (e.g., on a third-party platform). In other examples, the generative AI model 130 can be deployed locally on the ERP system 100. In some examples, generative AI access layer 128 can be configured to interface with a plurality of different generative AI models (e.g., via different application programming interfaces). Additionally, the ERP system 100 can include other components (not shown) that are tailored for specific ERP applications. For example, it could include a supply chain management module for optimizing logistics and distribution, a customer relationship management module for enhancing customer service, a human resources module for managing employee data and workflows, and so on. Any of these ERP applications can utilize the AI integration service 110 to enhance their functionalities with the power of generative AI.

A user 102 can interact with the AI integration service 110 via a user interface 112 (or "UI"). In some examples, through the user interface 112, the user 102 can enter prompts 104 which can be sent to the generative AI model 130 via the generative AI access layer 128. The generative AI model 130 can then generate a text output or response 106, which can be received by the generative AI access layer 128 and presented on the user interface 112.

Through the user interface 112, the user 102 can also enter one or more benchmarks 114. As described herein, benchmarks, also referred to as text benchmarks, are user-defined texts that capture the semantic information expected from generative AI responses. The benchmarks represent the ideal standards of response quality and context for specific service scenarios and can vary in length. For example, a benchmark can be a single word or a short phrase including multiple words. In some examples, a benchmark can be a paragraph. In still other examples, a benchmark can include multiple paragraphs or even a text document.

As shown, the AI integration service 110 can include an embedding engine 116 configured to convert or transform text into vector embeddings. The embedding process involves mapping words or phrases from the text to multi-dimensional vectors of real numbers. These vectors, also known as vector embeddings or simply embeddings, capture semantic and syntactic relationships between words, enabling mathematical operations on the text data. The embedding engine 116 can be configured to implement various embedding algorithms, such as Word2Vec, GloVe, FastText, BERT, or the like.

In some examples, each benchmark 114 can be transformed by the embedding engine 116 into a corresponding benchmark vector. The generated benchmark vectors for all user provided benchmarks 114 can be stored in a benchmark vector database 115.

The AI integration service 110 can include a segment generator 124 configured to divide the response 106 generated by the generative AI model 130 into multiple text segments. Different benchmarks 114 can have different segmentation schemes such that the same response 106 can be segmented differently depending on specific characteristics of each benchmark.

In some examples instance, the response 106 can be segmented into a plurality of text segments based on the length of or number of words (or tokens) in a benchmark 114. For instance, if the response 106 consists of ten words, and a given benchmark 114 consists of three tokens, the segment generator 124 can divide the response 106 into overlapping segments by sliding a window of three words (i.e., the length of the benchmark 114) one word at a time across the response 106. This results in eight overlapping segments, each containing three words. This segmentation scheme allows each segment of the response 106 to be directly comparable to the benchmark in terms of length, facilitating a more granular and contextually relevant evaluation of the AI-generated responses against the respective benchmarks. This approach is particularly useful when the length of the response 106 significantly exceeds that of the benchmark 114, enabling a detailed and nuanced comparison between the two. This sliding window approach ensures that all possible combinations of words in the response 106 are evaluated, enhancing the reliability of the evaluation process.

In some circumstances, alternative segmentation schemes could also be employed, such as fixed-length segmentation, where the response 106 is divided into segments of a fixed length regardless of the benchmark, or semantic segmentation, where the response is divided based on semantic units such as sentences or paragraphs. In one specific example, the segmentation can be optional such that the whole response 106 can be deemed as a one text segment.

Each text segment generated by the segment generator 124 can be transformed into a vector embedding by the embedding engine 116. The same embedding algorithm used for generating benchmark vectors is applied to these text segments.

The semantic similarity between each text segment and a selected benchmark can then be assessed by a similarity analyzer 118, which is configured to compare the vector embedding of the text segment and the vector embedding of the selected benchmark. This comparison can be performed using a measure of similarity, such as cosine similarity, which quantifies the cosine of the angle between the two vectors. A high cosine similarity indicates a smaller angle and hence a higher degree of semantic similarity between the text segment and the selected benchmark.

As described above, for each selected benchmark, the response 106 can be divided into a plurality of text segments (e.g., based on the length of the selected benchmark or other segmentation criteria). Each of these text segments can be compared to the selected benchmark via the similarity assessment of their respective embeddings. A matching score can be determined as the maximum of these similarities.

For instance, if the similarities between the selected benchmark and four text segments of the response 106 are [0.2, 0.3, 0.9, 0.4], even though some similarities are small, the maximum similarity is 0.9, which is quite high. Therefore, the matching score would be 0.9, indicating a high degree of semantic overlap between the response 106 and the selected benchmark. This approach effectively captures the most relevant segment of the response 106 for the selected benchmark, regardless of the smaller similarities. Thus, the matching score provides a quantitative measure of the relevance of the AI-generated response 106 to the selected benchmark, reflecting whether the selected benchmark is semantically related to or included in the response 106.

Optionally, prior to dividing the response 106 into multiple text segments, the response 106 can be preprocessed by a filter 122 to identify stop words and remove them from the response 106. Stop words are commonly used words (like articles, prepositions, pronouns, conjunctions, etc.) that do not carry significant meaning on their own in the context of text analysis. Example stop words include "the," "a," "an," "with," etc. Stop word removal can be achieved through various methods, such as using predefined stop word lists or applying frequency-based filtering where words that appear with high frequency across many documents are considered as stop words. The removal of stop words reduces the dimensionality of the response 106 and allows the system to focus on the more informative parts of the response 106. This preprocessing step can enhance the efficiency of the embedding process and improve the accuracy of the subsequent comparison with the benchmarks.

The AI integration service 110 can include a comparator 120 that is configured to determine the reliability of the response 106. This can be achieved by comparing one or more matching scores, each corresponding to a benchmark 114, with a matching threshold. The matching threshold can be predefined or provided by the user 102 through the user interface 112. The reliability assessment can be based on various criteria depending on circumstances. For instance, the response 106 may be deemed reliable if all matching scores are above the threshold, indicating a high degree of semantic overlap with all benchmarks 114. Alternatively, the response 106 could be considered reliable if a predefined percentage (e.g., a majority) of the matching scores are above the threshold. This would mean that the response 106 is semantically related to or includes a significant portion of the benchmarks 114. Other criteria could also be used depending on the specific requirements of the application, providing flexibility in assessing the reliability of the AI-generated responses.

In cases where the response 106 is determined to be not reliable (e.g., matching scores corresponding to all benchmarks 114 are below the threshold), a new prompt 104 can be automatically generated by a prompt generator 126. In some examples, this new prompt 104 can incorporate the content of the original prompt, but with additional contextual information. The added contextual information can indicate that some of the benchmarks 114 have corresponding matching scores that are below the matching threshold. The new prompt 104 can then be sent to the generative AI model 130 again to produce a new response 106. In other examples, the new prompt does not indicate that some of the benchmarks 114 have low matching scores. Instead, the new prompt can simply instruct the generative AI model 130 to generate a new response that is different from the original response or optionally augment the prompt with contextual information. This process of prompting can be iterated until one or more matching scores are above the predefined matching threshold so that the new response 106 is deemed reliable. This iterative approach allows continuous refinement of the AI-generated response 106, improving the matching scores with each iteration until the response meets the predefined threshold of reliability.

Adding contextual information to the prompt is beneficial as it guides the generative AI model 130 to produce a response 106 that is more aligned with the desired benchmarks 114. The additional context can highlight areas where the initial response fell short, providing explicit guidance to the generative AI model 130 about what aspects of the response need improvement. This is particularly useful in complex tasks where the desired output needs to satisfy multiple criteria represented by the benchmarks 114.

In practice, the systems shown herein, such as the ERP system 100, can vary in complexity, with additional functionality, more complex components, and the like. For example, there can be additional functionality within the AI integration service 110. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The ERP system 100 and any of the other systems described herein can be implemented in conjunction with any of the hardware components described herein, such as the computing systems described below (e.g., processing units, memory, and the like). In any of the examples herein, benchmarks, embeddings, prompts, responses, text segments, and the like can be stored in one or more computer-readable storage media or computer-readable storage devices. The technologies described herein can be generic to the specifics of operating systems or hardware and can be applied in any variety of environments to take advantage of the described features.

Figure 2:
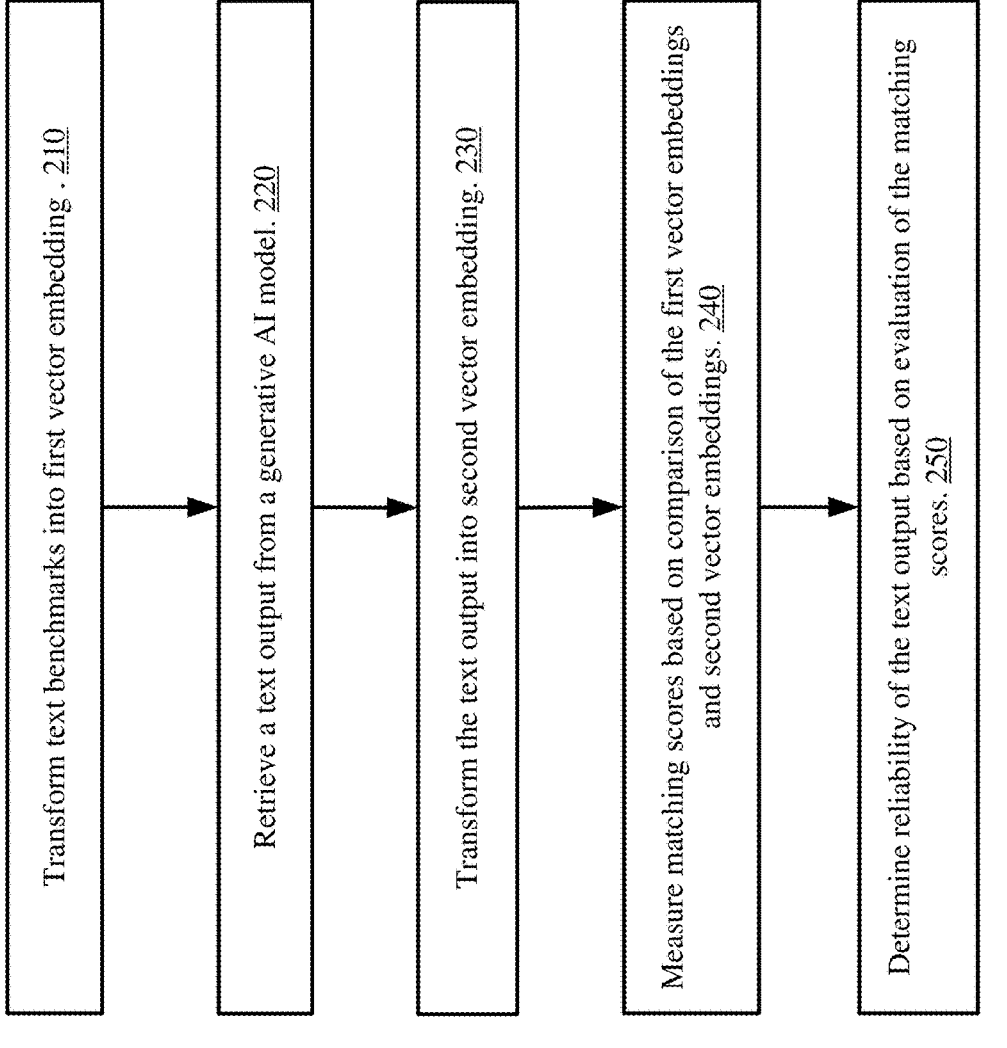
FIG. 2 is a flowchart illustrating an example overall method for enhancing generative AI reliability in an ERP system.

Example Overall Method for Enhancing Generative AI Reliability in ERP Systems FIG. 2 is a flowchart illustrating an example overall method 200 for enhancing generative AI reliability in ERP systems. The method 200 can be performed, e.g., by the AI integration service 110 of FIG. 1.

At step 210, one or more text benchmarks can be transformed (e.g., by the embedding engine 116) into one or more first vector embeddings (e.g., benchmark vectors).

At step 220, the method can retrieve a text output (e.g., the response 106) from a generative AI model in response to a user prompt (e.g., the prompt 104).

At step 230, the text output can be transformed into one or more second vector embeddings. This can be implemented, for example, by first dividing the text output into a plurality of text segments (e.g., using the segment generator 124) for a selected text benchmark, and then transforming the plurality of text segments into a plurality of second vector embeddings (e.g., using the embedding engine 116).

In some examples, dividing the text output into a plurality of text segments includes sliding a window of a finite length one token at a time across the text output. In some examples, the finite length of the window is equal to a count of tokens in the selected text benchmark.

At step 240, one or more matching scores can be measured (e.g., by the similarity analyzer 118) based on comparison of the one or more first vector embeddings with the one or more second vector embeddings. For instance, to measure a matching score, the method can first measure similarities between a first vector embedding transformed from the selected text benchmark and the plurality of second vector embeddings respectively transformed from the plurality of text segments. Then, the method can determine a maximum of the similarities and designate it as the matching score corresponding to the selected text benchmark.

In some examples, measuring a similarity between the first vector embedding and a second vector embedding includes calculating cosine similarity between the first vector embedding and the second vector embedding.

Then, at step 250, the method can determine reliability of the text output based on evaluation of the one or more matching scores. This can be implemented, for example, by comparing (e.g., using the comparator 120) the one or more matching scores with a predefined matching threshold.

In some examples, responsive to determining that the text output is not reliable, the method can prompt the generative AI model with another user prompt indicating some of the text benchmarks have corresponding matching scores that are below the predefined matching threshold. In some examples, such prompting can be iterated until the one or more matching scores are above the predefined matching threshold.

In some examples, the step 210, where one or more text benchmarks are transformed into first vector embeddings, can be performed offline. This means that the user can define text benchmarks and their embeddings can be generated in advance. The remaining steps (e.g., steps 220 through 250), however, can be automatically performed in runtime. This allows the system to provide real-time feedback to the user about the reliability of the response produced by the generative AI model. In some examples, the iterative prompting process itself can also be automatically performed in runtime so that the system can dynamically adjust the prompt to refine the AI-generated response based on the real-time evaluation of its reliability.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Process for Improving Reliability of AI Responses in ERP Systems

Figure 3:
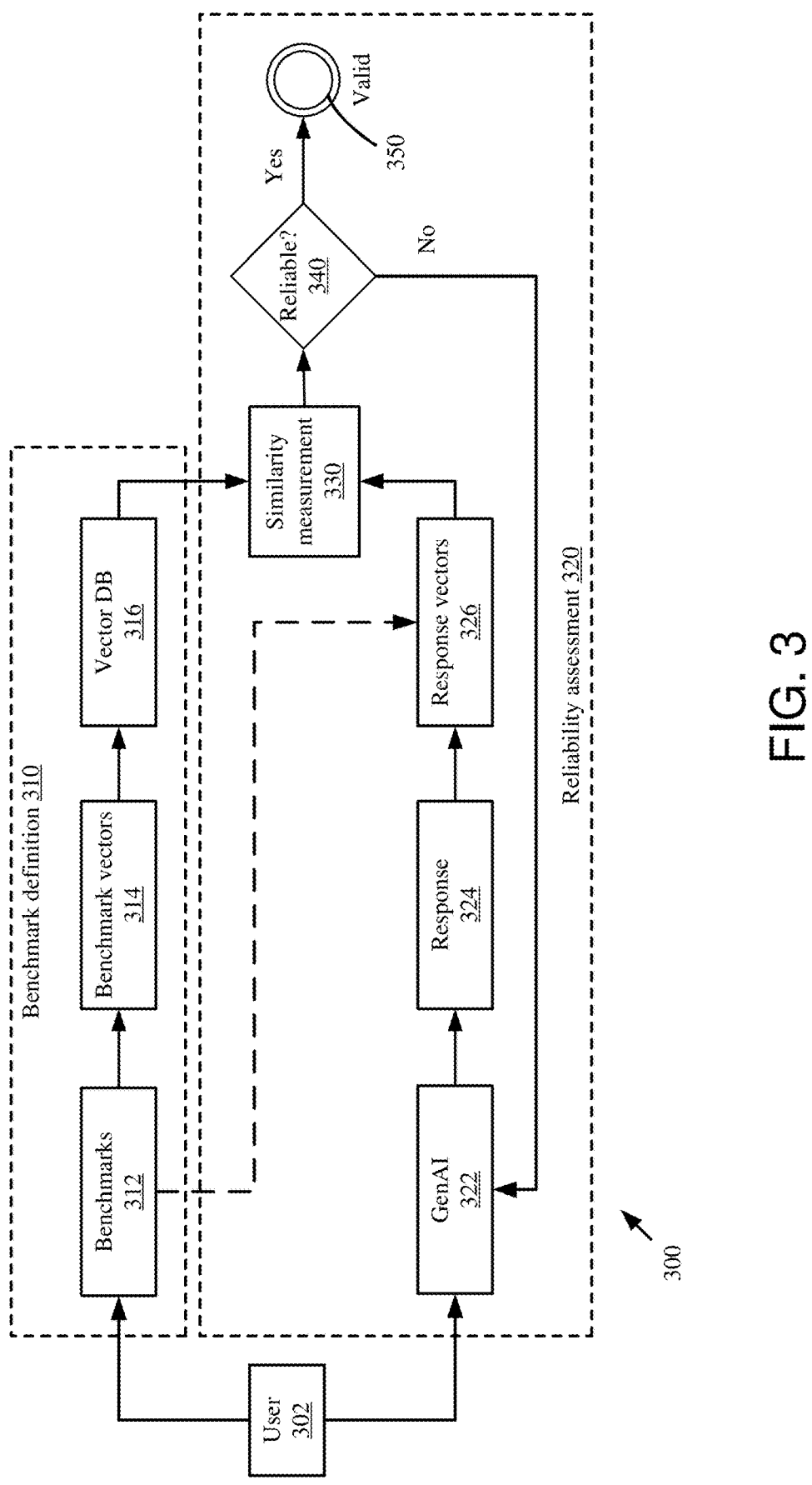
FIG. 3 is a flow diagram illustrating an example process for improving reliability of generative AI integrated into an ERP system.

FIG. 3 is a flow diagram illustrating an example process 300 for improving reliability of generative AI integrated into an ERP system.

The process 300 can include two phases: a benchmark definition phase 310 and a reliability assessment phase 320. The benchmark definition phase 310 can be executed in an offline environment, while the reliability assessment phase 320 is configured to operate in runtime, enabling real-time evaluation and response.

In the benchmark definition phase 310, a user 302 can define one or more benchmarks 312, each of which can be a term or phrase including one or more words. In some examples, a benchmark 312 can also include one or more sentences, one or more paragraphs, or a text document. The benchmarks 312 can then be embedded into respective benchmark vectors 314 which represent the multidimensional characteristics of the benchmarks 312 in a vector space. The generated benchmark vectors 314 can be stored in a vector database 316 for retrieval and comparison in the reliability assessment phase 320.

In the reliability assessment phase 320, the user 302 prompts a generative AI model 322 with a user prompt. Responsive to the prompt, the generative AI model 322 generates a text response 324. For each benchmark 312, the response 324 can be transformed into one or more response vectors 326. Specifically, the response 324 can be partitioned into one or more segments, each of which being transformed into a response vector through an embedding process. In some examples, the partitioning can be performed based on the length of the benchmark 312 such that each segment has the same number of words or tokens as the benchmark 312.

For each selected benchmark 312, its corresponding benchmark vector can be retrieved from the vector database 316 and compared with each of the one or more response vectors 326 corresponding to the selected benchmark 312 by means of similarity measurement 330 (e.g., cosine similarities). The maximum of the measured similarities can be determined as a matching score between the selected benchmark 312 and the response 324. The similarity measurement 330 can be repeated for each benchmark 312 independently. In other words, each benchmark 312 can have a respective matching score with the response 324 based on similarity measurement of their corresponding vector embeddings.

A condition check 340 can be performed to compare the determined matching scores with a predefined matching threshold to determine the reliability of the response 324. In some examples, the response 324 can be deemed reliable if the matching score for each benchmark 312 is above the predefined matching threshold, indicating a high degree of semantic overlap between the response 324 and the benchmarks 312. Alternatively, the response 324 could be considered reliable if a predefined percentage of the matching scores are above the threshold, indicating that the response 324 is semantically related to or includes a significant portion of the benchmarks 312.

If the condition check 340 finds the response 324 is reliable, the response 324 can be accepted as a valid response 350. Otherwise, a new prompt can be sent to the generative AI model 322 to elicit a new response. This new prompt can be an enhanced version of the original prompt, enriched with contextual information that highlights the benchmarks 312 that had matching scores below the matching threshold. This additional context can guide the generative AI model 322 to generate the new response that better aligns with the benchmarks 312. As described above, this process can be iterative, with each new response being evaluated for reliability. With each iteration, the generative AI model 322 refines its response, progressively improving the matching scores until a response is produced that satisfies the predefined reliability.

Example Overview of LLMs and Prompts

Generative AI models, foundation models, and LLMs are interconnected concepts in the field of AI. Generative AI, a broad term, encompasses AI systems that generate content such as text, images, music, or code. Unlike discriminative AI models that aim to make decisions or predictions based on input data features, generative AI models focus on creating new data points. Foundation models are a subset of these generative AI models, serving as a starting point for developing more specialized models. LLMs, a specific type of generative AI, work with language and can understand and generate human-like text. In the context of generative AI, including LLMs, a prompt serves as an input or instruction that informs the AI of the desired content, context, or task. This allows users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 4:
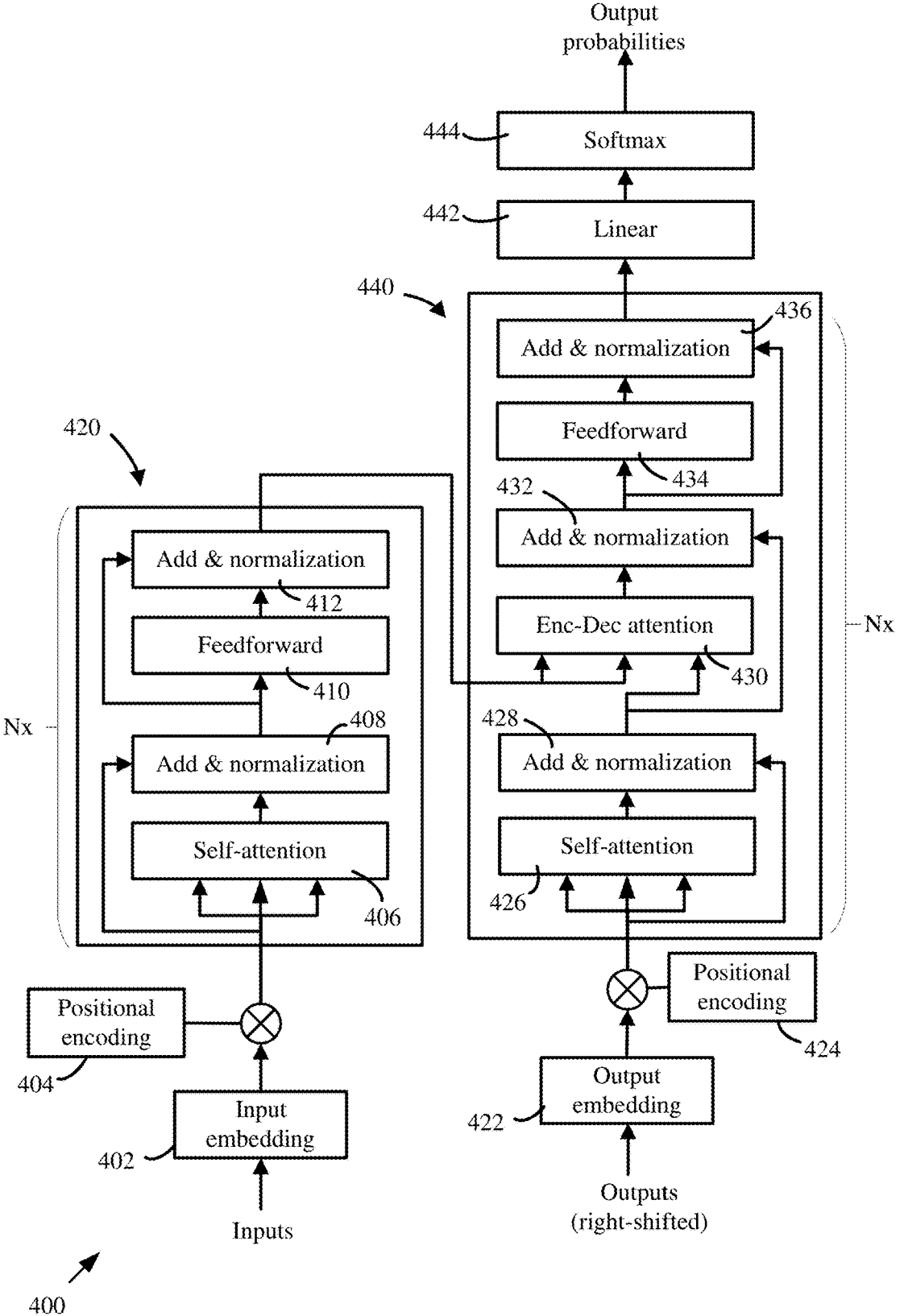
FIG. 4 is an architecture diagram of an example large language model.

FIG. 4 shows an example architecture of an LLM 400, which can be used as the external generative AI model 130 of FIG. 1.

In the depicted example, the LLM 400 uses an autoregressive model (as implemented in OpenAI's GPT) to generate text content by predicting the next word in a sequence given the previous words. The LLM 400 can be trained to maximize the likelihood of each word in the training dataset, given its context.

As shown in FIG. 4, the LLM 400 can have an encoder 420 and a decoder 440, the combination of which can be referred to as a "transformer." The encoder 420 processes input text, transforming it into a context-rich representation. The decoder 440 takes this representation and generates text output.

For autoregressive text generation, the LLM 400 generates text in order, and for each word it generates, it relies on the preceding words for context. During training, the target or output sequence, which the model is learning to generate, is presented to the decoder 440. However, the output is right shifted by one position compared to what the decoder 440 has generated so far. In other words, the model sees the context of the previous words and is tasked with predicting the next word. As a result, the LLM 400 can learn to generate text in a left-to-right manner, which is how language is typically constructed.

Text inputs to the encoder 420 can be preprocessed through an input embedding unit 402. Specifically, the input embedding unit 402 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 400, the targets or output sequences presented to the decoder 440 can be preprocessed through an output embedding unit 422. Like the input embedding unit 402, the output embedding unit 422 can provide a continuous representation, or output embedding, for each token in the output sequences.

Generally, the vocabulary in LLM 400 is fixed and is derived from the training data. The vocabulary in LLM 400 consists of tokens generated above during the training process. Words not in the vocabulary cannot be output. These tokens are strung together to form sentences in the text output.

In some examples, positional encodings (e.g., 404 and 424) can be performed to provide sequential order information of tokens generated by the input embedding unit 402 and output embedding unit 422, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 420 and decoder 440 can include multiple stacked or repeated layers (denoted by Nx in FIG. 4). The number of stacked layers in the encoder 420 and/or decoder 440 can vary depending on the specific LLM architecture. Generally, a higher "N" typically means a deeper model, which can capture more complex patterns and dependencies in the data but may require more computational resources for training and inference. In some examples, the number of stacked layers in the encoder 420 can be the same as the number of stacked layers in the decoder 440. In other examples, the LLM 400 can be configured so that the encoder 420 and decoder 440 can have different numbers of layers. For example, a deeper encoder (more layers) can be used to better capture the input text's complexities while a shallower decoder (fewer layers) can be used if the output generation task is less complex).

The encoder 420 and the decoder 440 are related through shared embeddings and attention mechanisms, which allow the decoder 440 to access the contextual information generated by the encoder 420, enabling the LLM 400 to generate coherent and contextually accurate responses. In other words, the output of the encoder 420 can serve as a foundation upon which the decoder network can build the generated text.

Both the encoder 420 and decoder 440 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 4, the encoder 420 includes an intra-attention or self-attention neural network 406 and a feedforward neural network 410, and the decoder 440 includes a self-attention neural network 426 and a feedforward neural network 434. The self-attention neural networks 406, 426 allow the LLM 400 to weigh the importance of different words or tokens within the same input sequence (self-attention in the encoder 420) and between the input and output sequences (self-attention in the decoder 440), respectively.

In addition, the decoder 440 also includes an inter-attention or encoder-decoder attention neural network 430, which receives input from the output of the encoder 420. The encoder-decoder attention neural network 430 allows the decoder 440 to focus on relevant parts of the input sequence (output of the encoder 420) while generating the output sequence. As described below, the output of the encoder 420 is a continuous representation or embedding of the input sequence. By feeding the output of the encoder 420 to the encoder-decoder attention neural network 430, the contextual information and relationships captured in the input sequence (by the encoder 420) can be carried to the decoder 440. Such connection enables the decoder 440 to access to the entire input sequence, rather than just the last hidden state. Because the decoder 440 can attend to all words in the input sequence, the input information can be aligned with the generation of output to improve contextual accuracy of the generated text output.

In some examples, one or more of the attention neural networks (e.g., 406, 426, 430) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 406, 426, 430) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 4, both the encoder 420 and the decoder 440 can include one or more addition and normalization layers (e.g., the layers 408 and 412 in the encoder 420, the layers 428, 432, and 436 in the decoder 440). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 442 at the output end of the decoder 440 can transform the output embeddings into the original input space. Specifically, the output embeddings produced by the decoder 440 are forwarded to the linear layer 442, which can transform the high-dimensional output embeddings into a space where each dimension corresponds to a word in the vocabulary of the LLM 400.

The output of the linear layer 442 can be fed to a softmax layer 444, which is configured to implement a softmax function, also known as softargmax or normalized exponential function, which is a generalization of the logistic function that compresses values into a given range. Specifically, the softmax layer 444 takes the output from the linear layer 442 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 4, the general operation process for the LLM 400 to generate a reply or text output in response to a received prompt input is described below.

First, the input text is tokenized, e.g., by the input embedding unit 402, into a sequence of tokens, each representing a word or part of a word. Each token is then mapped to a fixed-length vector or input embedding. Then, positional encoding 404 is added to the input embeddings to retain information regarding the order of words in the input text.

Next, the input embeddings are processed by the self-attention neural network 406 of the encoder 420 to generate a set of hidden states. As described above, multi-head attention mechanism can be used to focus on different parts of the input sequence. The output from the self-attention neural network 406 is added to its input (residual connection) and then normalized at the addition and normalization layer 408.

Then, the feedforward neural network 410 is applied to each token independently. The feedforward neural network 410 includes fully connected layers with non-linear activation functions, allowing the model to capture complex interactions between tokens. The output from the feedforward neural network 410 is added its input (residual connection) and then normalized at the addition and normalization layer 412.

The decoder 440 uses the hidden states from the encoder 420 and its own previous output sequence to generate the next token in an autoregressive manner so that the sequential output is generated by attending to the previously generated tokens. Specifically, the output of the encoder 420 (input embeddings processed by the encoder 420) are fed to the encoder-decoder attention neural network 430 of the decoder 440, which allows the decoder 440 to attend to all words in the input sequence. As described above, the encoder-decoder attention neural network 430 can implement a multi-head attention mechanism, e.g., computing a weighted sum of all the encoded input vectors, with the most relevant vectors being attributed the highest weights.

The previous output sequence of the decoder 440 is first tokenized by the output embedding unit 422 to generate an output embedding for each token in the output sequence. Similarly, positional embedding 424 is added to the output embedding to retain information regarding the order of words in the output sequence.

The output embeddings are processed by the self-attention neural network 426 of the decoder 440 to generate a set of hidden states. The self-attention mechanism allows each token in the text output to attend to all tokens in the input sequence as well as all previous tokens in the output sequence. The output from the self-attention neural network 426 is added to its input (residual connection) and then normalized at the addition and normalization layer 428.

The encoder-decoder attention neural network 430 receives the output embeddings processed through the self-attention neural network 426 and the addition and normalization layer 428. Additionally, the encoder-decoder attention neural network 430 also receives the output from the addition and normalization layer 412 which represents input embeddings processed by the encoder 420. By considering both processed input embeddings and output embeddings, the output of the encoder-decoder attention neural network 430 represents an output embedding which takes into account both the input sequence and the previously generated outputs. As a result, the decoder 440 can generate the output sequence that is contextually aligned with the input sequence.

The output from the encoder-decoder attention neural network 430 is added to part of its input (residual connection), i.e., the output from the addition and normalization layer 428, and then normalized at the addition and normalization layer 432. The normalized output from the addition and normalization layer 432 is then passed through the feedforward neural network 434. The output of the feedforward neural network 434 is then added to its input (residual connection) and then normalized at the addition and normalization layer 436.

The processed output embeddings output by the decoder 440 are passed through the linear layer 442, which maps the high-dimensional output embeddings back to the size of the vocabulary, that is, it transforms the output embeddings into a space where each dimension corresponds to a word in the vocabulary. The softmax layer 444 then converts output of the linear layer 442 into probabilities, each of which corresponds to the likelihood of a particular word being the next word in the sequence. Finally, the LLM 400 samples an output token from the probability distribution generated by the softmax layer 444 (e.g., selecting the token with the highest probability), and this token is added to the sequence of generated tokens for the text output.

The steps described above are repeated for each new token until an end-of-sequence token is generated or a maximum length is reached. Additionally, if the encoder 420 and/or decoder 440 have multiple stacked layers, the steps performed by the encoder 420 and decoder 440 are repeated across each layer in the encoder 420 and the decoder 440 for generation of each new token.

Example Use Cases

Several use cases are described herein to further illustrate reliability assessment of generative AI responses. In the following examples, the predefined matching threshold is assumed to be 0.80. As described above, the matching threshold is user customizable and can be changed according to the domain sensitivity and strictness of the application.

In one example (in a customer service context), a user prompts a generative AI model to explain how to reset a password. The generative AI provides the following response:

---

To reset your password, please use the 'Forgot Password' link on the login page. You will receive an email with instructions to reset your password.

---

Assuming the user has defined the following four benchmarks (predefined terms): "Password reset; Forgot Password; Email instructions; Login page." Then, for each benchmark, the following matching results can be obtained, based on the similarity measurement of their corresponding vector embeddings in the semantic space, as described above. In this example, the response can be deemed reliable because all four benchmarks semantically match the response.

| Benchmark | Matching score | Match status |
|---|---|---|
| Password reset | 0.8376 | Matched |
| Forgot Password | 0.9748 | Matched |
| Email instructions | 0.9395 | Matched |
| Login page | 0.9890 | Matched |

In another example (in a product description context), a generative AI model generates the following product description in response to a user's prompt:

---

Our latest smartphone model features a high-resolution camera, long-lasting battery life, and an intuitive user interface.

---

Assuming the user has defined the following four benchmarks (predefined terms): "Sustainable materials; Energy efficiency; Environmental impact; Recycling program." Then, for each benchmark, the following matching results can be obtained, based on the similarity measurement of their corresponding vector embeddings in the semantic space, as described above. In this example, the response can be deemed unreliable because none of the four benchmarks semantically matches the generative AI response.

| Benchmark | Matching score | Match status |
|---|---|---|
| Sustainable materials | 0.7837 | Not matched |
| Energy efficiency | 0.7432 | Not matched |
| Environmental impact | 0.5378 | Not matched |
| Recycling program | 0.4822 | Not matched |

In a third example (in the context of medical research), a generative AI model generates the following abstract in response to a user's prompt:

This study explores the efficacy of CRISPR-Cas9 gene editing in targeted cancer therapy, highlighting its potential in precision medicine and treatment customization based on individual genetic profiles.

Assuming the user has defined the following six benchmarks (predefined terms): "Gene modification technology; CRISPR-Cas9 effectiveness; Oncology treatment personalization; Molecular medicine advancements; Individualized therapeutic strategies; Genomic tailoring in healthcare." Then, for each benchmark, the following matching results can be obtained, based on the similarity measurement of their corresponding vector embeddings in the semantic space, as described above. In this example, four of the benchmarks are found to align with the response, but two other benchmarks are found not matching the response. The response can be deemed reliable if the reliability criteria require only a majority of the benchmarks match the response, or unreliable if the reliability criteria require all benchmarks must match the response.

| Benchmark | Matching score | Match status |
| --- | --- | --- |
| Gene modification technology | 0.8887 | Matched |
| CRISPR-Cas9 effectiveness | 0.8504 | Matched |
| Oncology treatment personalization | 0.8133 | Matched |
| Molecular medicine advancements | 0.7286 | Not matched |
| Individualized therapeutic strategies | 0.8075 | Matched |
| Genomic tailoring in healthcare | 0.7254 | Not matched |

In yet another example (in the context of supplier management), a user can define the following benchmarks: "Mileage; Date bought; Purchase price; cruise control; Max speed; Quietness; Overall happiness." In response to a user's prompt, a generative AI model generates the following supplier questionnaire:

Section 1: General Information

1. Make and model of the car:
2. Model year:
3. Vehicle identification number (VIN):
4. Odometer reading:
5. Date of purchase:
6. Purchase price:
7. Current market value:
Section 2: Engine and Transmission 1. Engine type:
2. Engine displacement (liters):
3. Number of cylinders:
4. Horsepower (kW):
5. Torque (Nm):
6. Transmission type:
7. Number of gears:
8. Final drive ratio:
Section 3: Fuel Economy and Emissions 1. Fuel type:
2. City fuel economy (mpg):
3. Highway fuel economy (mpg):
4. Combined fuel economy (mpg):
5. Carbon dioxide emissions (g/km):
Section 4: Safety Features 1. Anti-lock brakes (ABS):
2. Electronic stability control (ESC):
3. Traction control:
4. Airbags (front, side, curtain):
5. Seat belts (front, rear, center):
6. Child seat anchors:

-continued

7. Lane departure warning:
8. Blind spot monitoring:
9. Rear cross-traffic alert:
10. Adaptive cruise control:
Section 5: Comfort and Convenience Features 1. Air conditioning:
2. Power windows:
3. Power locks:
4. Remote keyless entry:
5. Cruise control:
6. Tilt and telescopic steering wheel:
7. Heated seats:
8. Ventilated seats:
9. Leather upholstery:
10. Sunroof/moonroof:
Section 6: Performance and Handling 1. Acceleration 0-60 mph (seconds):
2. Top speed (mph):
3. Braking distance from 60 mph (feet):
4. Slalom speed (mph):
5. Skidpad grip (g):
6. Turning circle diameter (feet):
7. Ride comfort:
8. Handling:
9. Noise, vibration, and harshness (NVH):
Section 7: Overall Satisfaction 1. Overall satisfaction with the car:
2. Likelihood of recommending the car to a friend:
3. Comments or suggestions for improvement:

Then, for each benchmark, the following matching results can be obtained, based on the similarity measurement of their corresponding vector embeddings in the semantic space, as described above. In this example, five of the benchmarks are found to match the response, while two other benchmarks are found not matching. The response can be deemed reliable if the reliability criteria require only a majority of the benchmarks match the response, or unreliable if the reliability criteria require all benchmarks must match the response.

| Benchmark | Matching score | Match status |
| --- | --- | --- |
| Mileage | 0.7906 | Not matched |
| Date bought | 0.8780 | Matched |
| Purchase price | 0.9804 | Matched |
| cruise control | 0.9846 | Matched |
| Max speed | 0.8264 | Matched |
| Quietness | 0.7700 | Not matched |
| Overall happiness | 0.9659 | Matched |

Example Advantages

The technologies described herein offer several technical advantages.

One technical advantage of the disclosed technologies is the use of vector-based semantic comparison. Unlike traditional text-based comparisons, which are primarily keyword-dependent, the disclosed approach leverages semantic embeddings and vector similarity. Specifically, the disclosed technologies dynamically evaluate generative AI outputs by segmenting responses, generating semantic embeddings, and measuring vector similarity for semantic alignment. This approach significantly enhances the accuracy and relevance of AI-generated content, ensuring that the responses align closely with predefined semantic standards, thereby reducing the risk of producing incorrect or contextually inappropriate information.

The disclosed technologies also leverage an iterative approach for re-prompting and response generation. This iterative approach allows for the continuous refinement of AI-generated responses based on feedback from benchmark comparisons. Each iteration presents an opportunity for the AI model to adjust its output, thereby progressively improving the matching scores. This process continues until the response meets predefined reliability criteria, ensuring the generation of contextually reliable responses.

Further, the technologies described herein can be seamlessly integrated with existing ERP infrastructures, ensuring smooth adoption and operational continuity. The disclosed technologies can automate the evaluation of AI responses, saving time and resources while maintaining quality standards and enhancing user experience. Moreover, the disclosed technologies present a scalable and flexible solution, adaptable to various service scenarios and diverse linguistic requirements, which can go beyond ERP applications.

Example Computing Systems

Figure 5:
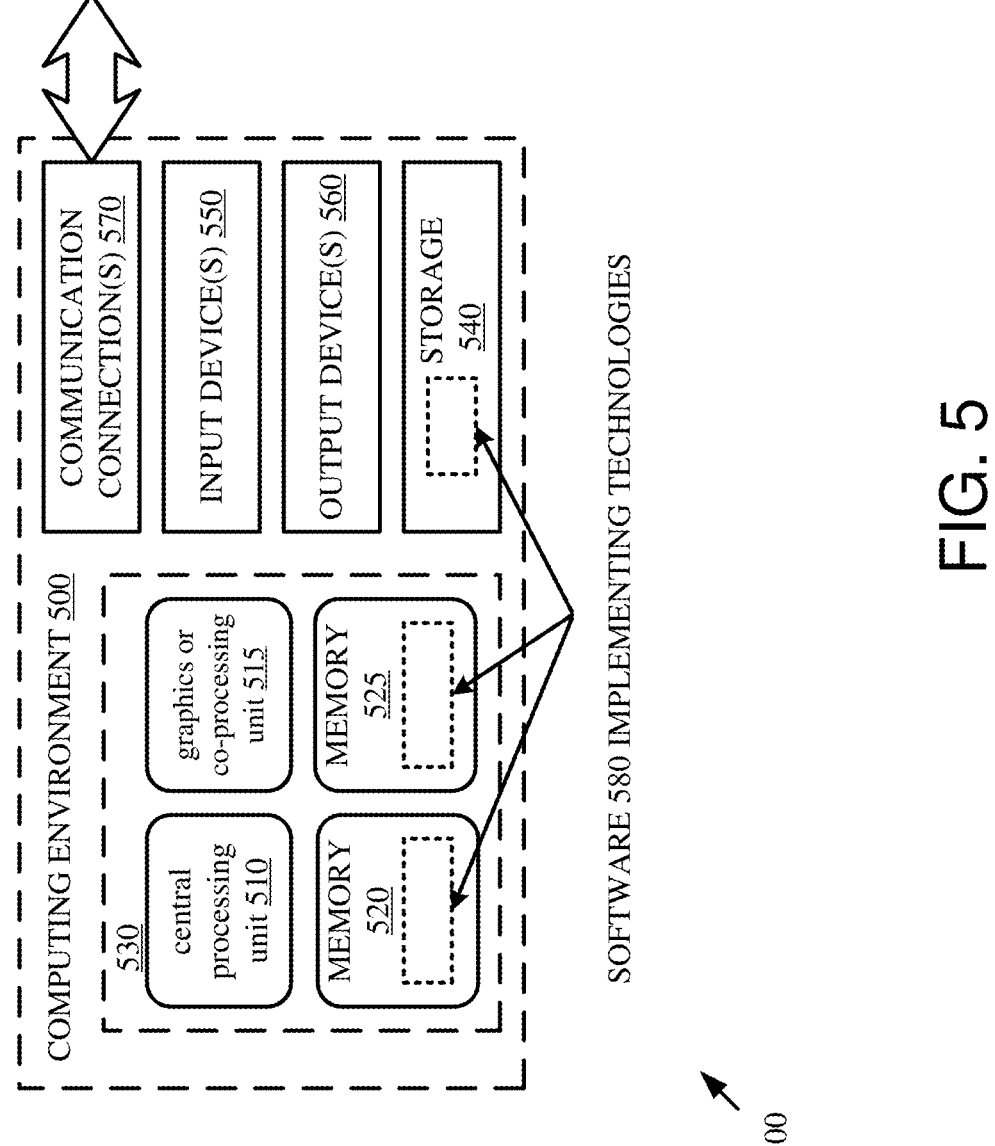
FIG. 5 is a block diagram of an example computing system in which described embodiments can be implemented.

FIG. 5 depicts an example of a suitable computing system 500 in which the described innovations can be implemented. The computing system 500 is not intended to suggest any limitation as to scope of use or functionality of the present disclosure, as the innovations can be implemented in diverse computing systems.

With reference to FIG. 5, the computing system 500 includes one or more processing units 510, 515 and memory 520, 525. In FIG. 5, this basic configuration 530 is included within a dashed line. The processing units 510, 515 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 5 shows a central processing unit 510 as well as a graphics processing unit or co-processing unit 515. The tangible memory 520, 525 can be volatile memory (e.g., registers, cache, RAM), non-volatile memory (e.g., ROM, EEPROM, flash memory, etc.), or some combination of the two, accessible by the processing unit(s) 510, 515. The memory 520, 525 can store software 580 implementing one or more innovations described herein, in the form of computer-executable instructions suitable for execution by the processing unit(s) 510, 515.

A computing system 500 can have additional features. For example, the computing system 500 can include storage 540, one or more input devices 550, one or more output devices 560, and one or more communication connections 570, including input devices, output devices, and communication connections for interacting with a user. An interconnection mechanism (not shown) such as a bus, controller, or network can interconnect the components of the computing system 500. Typically, operating system software (not shown) can provide an operating environment for other software executing in the computing system 500, and coordinate activities of the components of the computing system 500.

The tangible storage 540 can be removable or non-removable, and includes magnetic disks, magnetic tapes or cassettes, CD-ROMs, DVDs, or any other medium which can be used to store information in a non-transitory way and which can be accessed within the computing system 500. The storage 540 can store instructions for the software implementing one or more innovations described herein.

The input device(s) 550 can be an input device such as a keyboard, mouse, pen, or trackball, a voice input device, a scanning device, touch device (e.g., touchpad, display, or the like) or another device that provides input to the computing system 500. The output device(s) 560 can be a display, printer, speaker, CD-writer, or another device that provides output from the computing system 500.

The communication connection(s) 570 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 6:
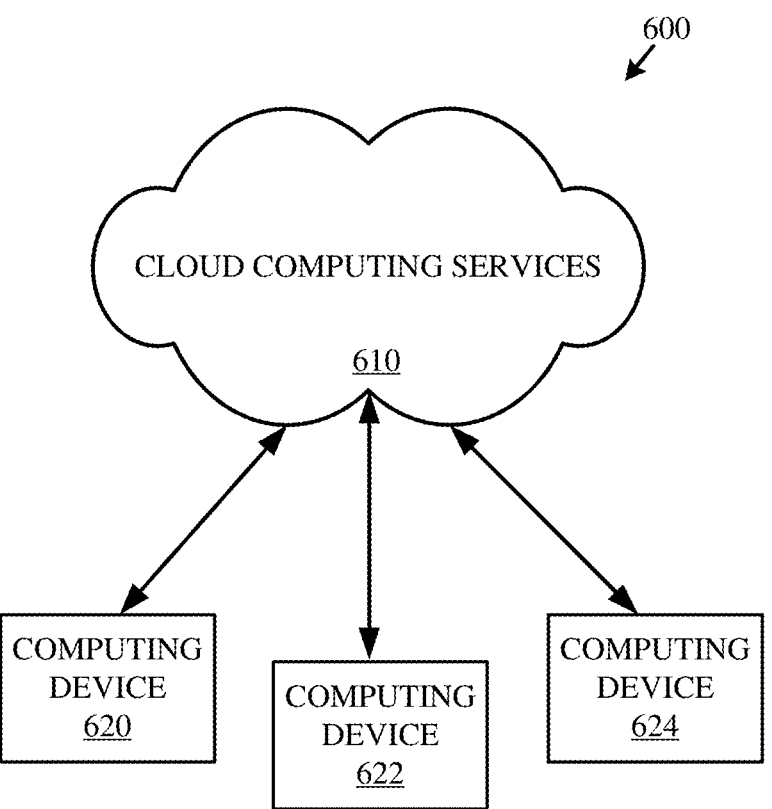
FIG. 6 is a block diagram of an example cloud computing environment that can be used in conjunction with the technologies described herein.

FIG. 6 depicts an example cloud computing environment 600 in which the described technologies can be implemented, including, e.g., the system 100 and other systems herein. The cloud computing environment 600 can include cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 can be utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Although specific prompt templates are described above, it should be understood that these prompt templates are merely examples for illustration purposes, and different prompt templates can be used based on the principles described herein.

In any of the examples described herein, an operation performed in runtime means that the operation can be completed in real time or with negligible processing latency (e.g., the operation can be completed within one second or the like).

Example Clauses

Any of the following example clauses can be implemented.

Clause 1. A computing system for improving reliability of responses generated by a generative artificial intelligence (AI) model integrated with an enterprise resource planning system, the computing system comprising: memory; one or more hardware processors coupled to the memory; and one or more computer readable storage media storing instructions that, when loaded into the memory, cause the one or more hardware processors to perform operations comprising: transforming one or more text benchmarks into one or more first vector embeddings; retrieving a text output from the generative AI model in response to a user prompt; transforming the text output into one or more second vector embeddings; measuring one or more matching scores based on comparison of the one or more first vector embeddings with the one or more second vector embeddings; and determining reliability of the text output based on evaluation of the one or more matching scores.

Clause 2. The computing system of clause 1, wherein the operations further comprise dividing the text output into a plurality of text segments for a selected text benchmark, wherein transforming the text output into one or more second vector embeddings comprises transforming the plurality of text segments into a plurality of second vector embeddings.

Clause 3. The computing system of clause 2, wherein measuring a matching score comprises: measuring similarities between a first vector embedding transformed from the selected text benchmark and the plurality of second vector embeddings respectively transformed from the plurality of text segments; and determining a maximum of the similarities.

Clause 4. The computing system of clause 3, wherein measuring a similarity between the first vector embedding and a second vector embedding comprises calculating cosine similarity between the first vector embedding and the second vector embedding.

Clause 5. The computing system of any one of clauses 2-4, wherein dividing the text output into a plurality of text segments comprises sliding a window of a finite length one token at a time across the text output.

Clause 6. The computing system of clause 5, wherein the finite length of the window is equal to a count of tokens in the selected text benchmark.

Clause 7. The computing system of any one of clauses 1-6, wherein determining reliability of the text output comprises comparing the one or more matching scores with a predefined matching threshold.

Clause 8. The computing system of clause 7, wherein the operations further comprise: responsive to determining that the text output is not reliable, prompting the generative AI model with another user prompt indicating some of the text benchmarks have corresponding matching scores that are below the predefined matching threshold.

Clause 9. The computing system of clause 8, wherein the prompting is iterated until the one or more matching scores are above the predefined matching threshold.

Clause 10. The computing system of any one of clauses 1-9, wherein the operations further comprise: prior to transforming the text output into one or more second vector embeddings, removing stop words from the text output.

Clause 11. A computer-implemented method for improving reliability of responses generated by a generative artificial intelligence (AI) model integrated with an enterprise resource planning system, the method comprising: transforming one or more text benchmarks into one or more first vector embeddings; retrieving a text output from the generative AI model in response to a user prompt; transforming the text output into one or more second vector embeddings; measuring one or more matching scores based on comparison of the one or more first vector embeddings with the one or more second vector embeddings; and determining reliability of the text output based on evaluation of the one or more matching scores.

Clause 12. The computer-implemented method of clause 11, further comprising dividing the text output into a plurality of text segments for a selected text benchmark, wherein transforming the text output into one or more second vector embeddings comprises transforming the plurality of text segments into a plurality of second vector embeddings.

Clause 13. The computer-implemented method of clause 12, wherein measuring a matching score comprises: measuring similarities between a first vector embedding transformed from the selected text benchmark and the plurality of second vector embeddings respectively transformed from the plurality of text segments; and determining a maximum of the similarities.

Clause 14. The computer-implemented method of clause 13, wherein measuring a similarity between the first vector embedding and a second vector embedding comprises calculating cosine similarity between the first vector embedding and the second vector embedding.

Clause 15. The computer-implemented method of any one of clauses 12-14, wherein dividing the text output into a plurality of text segments comprises sliding a window of a finite length one token at a time across the text output.

Clause 16. The computer-implemented method of clause 15, wherein the finite length of the window is equal to a count of tokens in the selected text benchmark.

Clause 17. The computer-implemented method of any one of clauses 11-16, wherein determining reliability of the text output comprises comparing the one or more matching scores with a predefined matching threshold.

Clause 18. The computer-implemented method of clause 17, further comprising: responsive to determining that the text output is not reliable, prompting the generative AI model with another user prompt indicating some of the text benchmarks have corresponding matching scores that are below the predefined matching threshold.

Clause 19. The computer-implemented method of any one of clauses 11-18, further comprising: prior to transforming the text output into one or more second vector embeddings, removing stop words from the text output.

Clause 20. One or more non-transitory computer-readable media having encoded thereon computer-executable instructions causing one or more processors to perform a method for improving reliability of responses generated by a generative artificial intelligence (AI) model integrated with an enterprise resource planning system, the method comprising: transforming one or more text benchmarks into one or more first vector embeddings; retrieving a text output from the generative AI model in response to a user prompt; transforming the text output into one or more second vector embeddings; measuring one or more matching scores based on comparison of the one or more first vector embeddings with the one or more second vector embeddings; and determining reliability of the text output based on evaluation of the one or more matching scores.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system for improving reliability of responses generated by a generative artificial intelligence (AI) model integrated with an enterprise resource planning system, the computing system comprising:

memory;

one or more hardware processors coupled to the memory; and one or more computer readable storage media storing instructions that, when loaded into the memory, cause the one or more hardware processors to perform operations comprising:

transforming one or more text benchmarks into one or more first vector embeddings, wherein the one or more text benchmarks comprise user-defined text capturing semantic information expected from the responses generated by the generative AI model at runtime;

retrieving a text output from the generative AI model in response to a user prompt provided by a user;

transforming the text output into one or more second vector embeddings;

measuring one or more matching scores based on comparison of the one or more first vector embeddings with the one or more second vector embeddings, wherein the one or more matching scores quantify relevance of the text output to the one or more text benchmarks; and determining reliability of the text output based on evaluation of the one or more matching scores; and providing real-time feedback to the user about the reliability of the text output produced by the generative AI.

2. The computing system of claim 1, wherein the operations further comprise dividing the text output into a plurality of text segments for a selected text benchmark, wherein transforming the text output into one or more second vector embeddings comprises transforming the plurality of text segments into a plurality of second vector embeddings.

3. The computing system of claim 2, wherein measuring a matching score comprises:

measuring similarities between a first vector embedding transformed from the selected text benchmark and the plurality of second vector embeddings respectively transformed from the plurality of text segments; and determining a maximum of the similarities.

4. The computing system of claim 3, wherein measuring a similarity between the first vector embedding and a second vector embedding comprises calculating cosine similarity between the first vector embedding and the second vector embedding.

5. The computing system of claim 2, wherein dividing the text output into a plurality of text segments comprises sliding a window of a finite length one token at a time across the text output.

6. The computing system of claim 5, wherein the finite length of the window is equal to a count of tokens in the selected text benchmark.

7. The computing system of claim 1, wherein determining reliability of the text output comprises comparing the one or more matching scores with a predefined matching threshold.

8. The computing system of claim 7, wherein the operations further comprise: responsive to determining that the text output is not reliable, prompting the generative AI model with another user prompt indicating some of the text benchmarks have corresponding matching scores that are below the predefined matching threshold.

9. The computing system of claim 8, wherein the prompting is iterated until the one or more matching scores are above the predefined matching threshold.

10. The computing system of claim 1, wherein the operations further comprise: prior to transforming the text output into one or more second vector embeddings, removing stop words from the text output.

11. A computer-implemented method for improving reliability of responses generated by a generative artificial intelligence (AI) model integrated with an enterprise resource planning system, the method comprising:

transforming one or more text benchmarks into one or more first vector embeddings, wherein the one or more text benchmarks comprise user-defined text capturing semantic information expected from the responses generated by the generative AI model at runtime;

retrieving a text output from the generative AI model in response to a user prompt provided by a user;

transforming the text output into one or more second vector embeddings;

measuring one or more matching scores based on comparison of the one or more first vector embeddings with the one or more second vector embeddings, wherein the one or more matching scores quantify relevance of the text output to the one or more text benchmarks;

determining reliability of the text output based on evaluation of the one or more matching scores; and providing real-time feedback to the user about the reliability of the text output produced by the generative AI model.

12. The computer-implemented method of claim 11, further comprising dividing the text output into a plurality of text segments for a selected text benchmark, wherein transforming the text output into one or more second vector embeddings comprises transforming the plurality of text segments into a plurality of second vector embeddings.

13. The computer-implemented method of claim 12, wherein measuring a matching score comprises:

measuring similarities between a first vector embedding transformed from the selected text benchmark and the plurality of second vector embeddings respectively transformed from the plurality of text segments; and determining a maximum of the similarities.

14. The computer-implemented method of claim 13, wherein measuring a similarity between the first vector embedding and a second vector embedding comprises calculating cosine similarity between the first vector embedding and the second vector embedding.

15. The computer-implemented method of claim 12, wherein dividing the text output into a plurality of text segments comprises sliding a window of a finite length one token at a time across the text output.

16. The computer-implemented method of claim 15, wherein the finite length of the window is equal to a count of tokens in the selected text benchmark.

17. The computer-implemented method of claim 11, wherein determining reliability of the text output comprises comparing the one or more matching scores with a predefined matching threshold.

18. The computer-implemented method of claim 17, further comprising: responsive to determining that the text output is not reliable, prompting the generative AI model with another user prompt indicating some of the text benchmarks have corresponding matching scores that are below the predefined matching threshold.

19. The computer-implemented method of claim 11, further comprising: prior to transforming the text output into one or more second vector embeddings, removing stop words from the text output.

20. One or more non-transitory computer-readable media having encoded thereon computer-executable instructions causing one or more processors to perform a method for improving reliability of responses generated by a generative artificial intelligence (AI) model integrated with an enterprise resource planning system, the method comprising:

transforming one or more text benchmarks into one or more first vector embeddings, wherein the one or more text benchmarks comprise user-defined text capturing semantic information expected from the responses generated by the generative AI model at runtime;

retrieving a text output from the generative AI model in response to a user prompt provided by a user;

transforming the text output into one or more second vector embeddings;

measuring one or more matching scores based on comparison of the one or more first vector embeddings with the one or more second vector embeddings, wherein the one or more matching scores quantify relevance of the text output to the one or more text benchmarks;

determining reliability of the text output based on evaluation of the one or more matching scores; and providing real-time feedback to the user about the reliability of the text output produced by the generative AI model.

\* \* \* \* \*